May 12, 1959     H. GROHGANZ     2,886,563
RECOVERY OF VISCOSE FROM VISCOSE WASTE
Filed Dec. 10, 1957
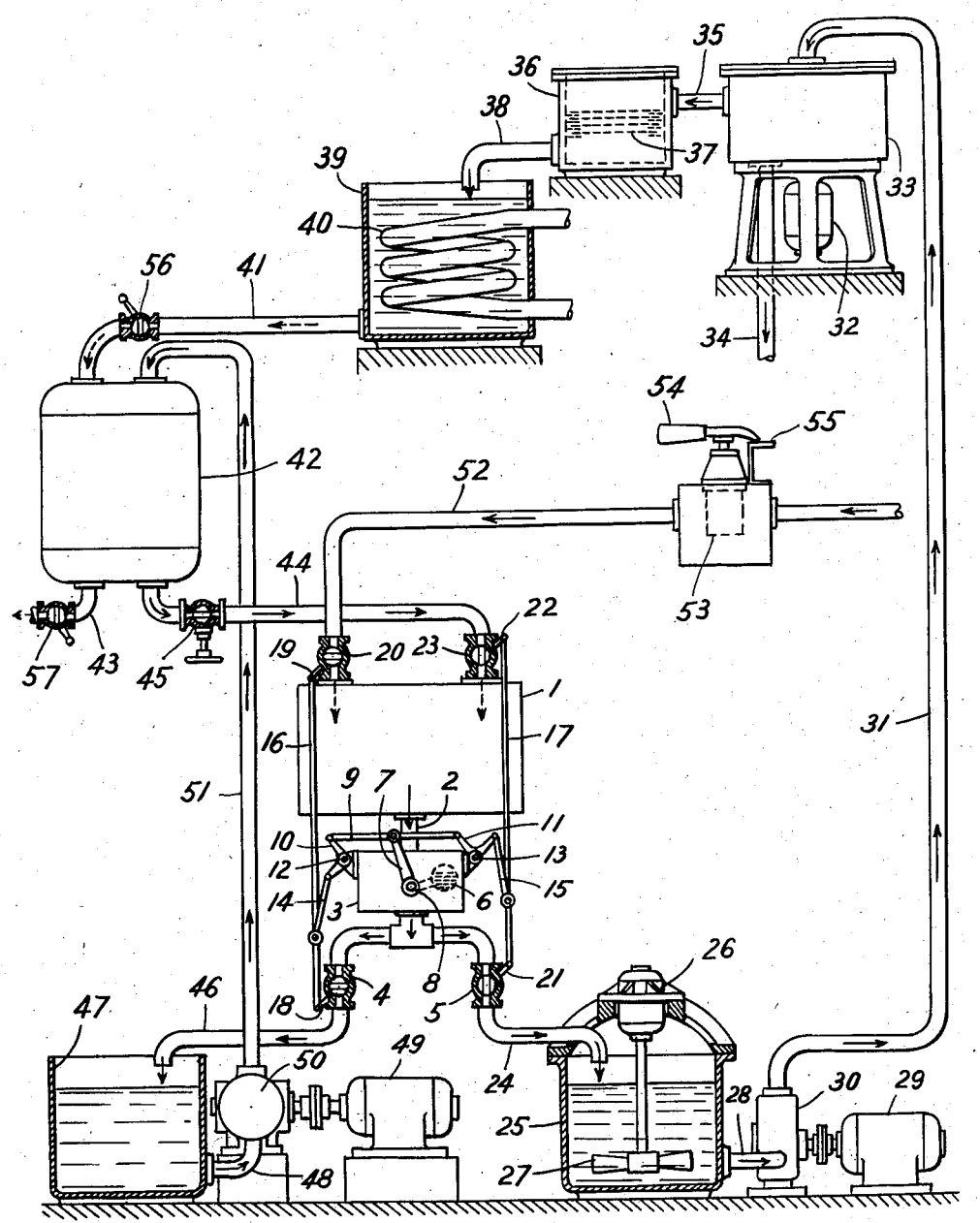
INVENTOR
HERMANN GROHGANZ
ATTORNEYS United States Patent Office 2,886,563
Patented May 12, 1959

2,886,563

RECOVERY OF VISCOSE FROM VISCOSE WASTE

Hermann Grohganz, Lenzing, Oberosterreich, Austria, assignor to Zellwolle Lenzing Aktiengesellschaft, Lenzing, Oberosterreich, Austria Application December 10, 1957, Serial No. 701,911

Claims priority, application Austria December 13, 1956

7 Claims. (Cl. 260—218)

This invention relates to a process of recovering viscose from viscose waste and more particularly it relates to a process of recovering viscose from filter cloths and viscose making equipment. Furthermore, this invention relates to a plant for recovering viscose from filter cloths and a washing installation for removing viscose from filter cloths.

At the present time, large quantities of cellulose xanthate and sodium hydroxide are still lost in the commercial production of viscose. Viscose residues always remain on the walls, bottom surfaces and stirrers of the xanthate dissolving apparatus, e.g., the xanthate kneaders, in the filtering apparatus or filter cloths employed. It has not been possible so far to re-use these residues. This waste viscose was previously removed in most cases with water and the washings were fed in a neutralized condition to clarification plants or settling ponds. This involves the loss of considerable quantities of regenerable cellulose and of sodium hydroxide for economic utilization.

The U.S. patent specification No. 2,647,891 describes a process of recovering viscose, in which viscose residues which remain in the filter presses after the filtration has been completed are washed out with water. The dilute viscose solutions thus obtained are then used for dissolving cellulose xanthate. In this process, however, only part of the viscose which remains in the filter presses is dissolved because after a short time the water provided for dissolving the viscose flows off without effect through a few preferred channels having a relatively low resistance to flow whereas the major portion of the viscose remains on the filter surfaces. Another very important disadvantage of this process resides in that a large part of the swelling bodies retained by the filter during the filtration is washed through the filter by the water and enters the dilute viscose solution intended for re-use. The resulting dilute viscose solution, which is contaminated by swelling bodies and dirt particles, is unsuitable for re-use, e.g., for dissolving xanthate. The use of such viscose solutions disturbs the sulfidization and it leads to the formation of viscoses which can be filtered only with great difficulty owing to their increased content of swelling bodies.

It is known that the filtration of viscose involves a considerable loss of matter (see e.g., K. Götze, "Chemiefasern nach dem Viskoseverfahren," 2nd edition, p. 345). This loss is in general 0.5% of the total viscose and may rise up to 1% where beech pulp is processed. These losses increase with the cellulose content and viscosity of the viscose. For this reason at least part of the viscose which remains in the filter presses after the filtration has been completed is generally recovered in an undiluted condition by dripping. After the viscose has dripped off, the filter cloths are cleaned in washing machines with softened water, whereafter they are dried and re-used.

It has also been proposed to recover and re-use the viscose which adheres to filter cloths by removing the viscose from the filter cloths with water or an alkaline solution filtering the resulting washing, and adding the viscose thus obtained to the solvent for the cellulose xanthate. An excessive dissolution of the solvent is to be avoided to prevent a deposition of viscose on the filter cloths. For this reason it has been proposed to use only such an amount of water or alkaline solution in washing the filter cloths in order to remove the adhering viscose residues that a viscose solution is obtained which is diluted, at most, to a cellulose content of 0.3%.

According to a priror proposal, which has not been published, the washings coming from the washing machines for filter cloths and containing dilute viscose and a major portion of the impurities retained by the filter, are re-used in the viscose process without filtration, whereby waste viscose is recovered. Dirt particles, fiber fragments and particularly the swelling bodies, which can be filtered only with difficulty, are practically completely removed in a centrifugal separator. In this process of recovering viscose waste, which comprises washing the filter cloths, separating foreign matter from the resulting washings, and adding the cleaned washings to the solvent for the cellulose xanthate, the concentrated first washings obtained are directly fed to a centrifugal separator for separating the impurities whereas the dilute second washings are used for cleaning viscose making machines, particularly by squirting, whereby the washings are enriched with viscose and are then also freed from the impurities in a centrifugal separator, possibly together with the first washings. This prior process gives two kinds of viscose-containing washings, namely concentrated washings obtained by pre-washing the filter cloths, and comparatively dilute washings obtained after the operation of washing the viscose making and dissolving apparatus. Considerable amounts of liquid are thus obtained because fresh permutit water is always used for the pre-washing and re-washing of the filter cloths.

An object of the present invention is to provide a process of recovering viscose, which gives an even better cleaning effect and, at the same time, more highly concentrated viscose washings in a shorter time and with smaller amounts of washing water. Another object of this invention is to dissolve readily without any decomposition of viscose the last residues of viscose, even of over aged viscose for spinning. Other objects will appear hereinafter.

These objects are accomplished if the recovery of viscose from used filter cloths by washing the same, separating the impurities from the washings and using the viscose-containing cleaned solution for dissolving additional cellulose xanthate is carried out in such a manner that the filter cloths covered with aged viscose are first subjected to a pre-washing with the washings obtained by the cleaning of the viscose making machines, which contains free sodium hydroxide and fresh, non-aged viscose, which pre-washing is continued until the major portion of the viscose waste contained in the filter cloths has been washed out, whereafter the pre-cleaned filter cloths are re-washed with permutit water adjusted to a pH not less then 7 until they are practically free of viscose and in any case until the washings contain much less than 0.3% cellulose, the enriched washings, which contain now the entire cellulose xanthate and solvent residues from the viscose making apparatus and the major portion of said residues from the filter cloths, are then freed in a centrifugal separator from the impurities and the dilute washings obtained by the re-washing of the filter cloths are used for cleaning the viscose making machines.

It has also been found that the last residues of viscose, even of over-aged viscose for spinning, can be readily dissolved without any decomposition of viscose, which would adversely affect a perfect cleaning of the filter cloths, if care is taken that the permutit water used for re-washing contains neither free carbonic acid nor acid carbonates, the permutit water to be employed being adjusted to a pH not less than 7.

In the process according to the invention the process of washing the filter cloths in the washing machine may be carried out in two or more successive stages or continuously. The more highly concentrated washings, which contain almost the entire amount of the viscose residues, may be separated from the more dilute washings, which have only a low viscose content, in a manner known per se, e.g., by means of a valve under control of a water meter. Whereas the more highly concentrated washings are supplied through a collecting vessel by means of a pump directly to a centrifugal separator and further to the solvent container, the dilute washings are fed by a pressure pump from the collecting vessel to the viscose making sets and are used for cleaning the same, e.g., for squirting out the xanthate kneaders. Thus the viscose residues are removed from the walls, stirrers and bottoms of said apparatus and absorbed by the dilute washings, which are then used in the first stage for washing the filter cloths, whereby the concentrated washings are obtained. Before being fed to the centrifugal separators these concentrated washings are adjusted to a viscose concentration of approximately 6%, at most, preferably of 2.5–5% by weight, to ensure a good separating action. This adjustment may be effected by a corresponding control of the rate at which permutit water is supplied to the washing machine.

This enables a practically perfect removal of all kinds of impurities with which the washings are enriched, including the swelling bodies which can be removed only with difficulty by other methods. In this way an important requisite for the re-use of the washings is fulfilled.

The invention will be better understood by reference to the following illustrative but not limitative example of a plant for carrying out the process according to the invention which is shown in the drawing.

1 is a washing machine for the viscose-containing filter cloths. A control device 3 for the coupled change-over of two discharge valves 4 and 5 is inserted in the discharge line 2 from the washing machine 1. The control device operates in response to the concentration of the washings discharged by the washing machine. As is diagrammatically indicated in the drawing, it may be operated by a float 6, which is balanced like a hydrometer and is connected to a change-over lever 7, with which it is rotatable about a shaft 8. The change-over lever is pivoted to a transverse drive rod 9, both ends of which are pivoted to one arm of bell-crank levers 10 and 11, respectively, which are rotatable about pins 12, 13 mounted on the housing of the control device 3. The arms of the bell-crank levers 10, 11 are linked by two push rods 14 and 15 to two vertical coupling rods 16 and 17. The coupling rod 16 connects the operating lever 18 of the discharge valve 4 to the operating lever 19 of an admission valve 20 on the washing machine 1. The coupling rod 17 connects the operating lever 21 of the discharge valve 5 to the operating lever 22 of an admission valve 23 on the washing machine 1. A conduit 24 leads from the discharge valve 5 of the washing machine to a collecting vessel 25 for highly concentrated and contaminated washings. The collecting vessel 25 is provided with a stirrer 27, which is driven by an electric motor 26. A conduit 28 connects the collecting vessel 25 to a pump 30 driven by an electric motor 29. A conduit 31 leads from this pump to a diagrammatically shown centrifugal separator 33, which is driven by an electric motor 32. The centrifugal separator 33 is provided with a discharge conduit 34 and is connected by a conduit 35 to a safety filtering unit 36, which contains a diagrammatically indicated filtering device 37. A conduit 38 leads from the safety filtering unit 36 to a supply vessel 39 for xanthate-dissolving liquor or dissolving water. This vessel 39 may be provided with a heater, e.g., a heating pipe coil 40. The supply vessel 39 is connected to a viscose making apparatus 42 by a pipeline 41 provided with an inlet valve 56. To the viscose making apparatus a discharge pipe 43 for the viscose, provided with a discharge valve 57, and a connecting conduit 44, provided with a discharge valve 45, are connected. The conduit 44 leads to the admission valve 23 on the washing machine 1. A conduit 46 leads from the discharge valve 4 of the washing machine 1 to a collecting vessel 47 for dilute washings. The vessel 47 is connected by a conduit 48 to a pressure pump 50 driven by an electric motor 49. A discharge line 51 leads from the pressure pump 50 to the viscose making apparatus 42. A conduit 52 for supplying fresh permutit water is connected to the admission valve 20 of the washing machine 1 and incorporates a device 53 for the metered admixing of an alkaline solution to adjust the desired pH-value. The amount to be admixed may be adjusted by means of a hand lever 54 and can be read from a scale 55.

In the two-stage washing process the filter cloths contained in the washing machine 1 and having viscose adhering thereto are first pre-washed with enriched washings supplied to the washing machine 1 from the viscose making apparatus 42 by way of the discharge valve 45, the conduit 44, which in practice is arranged in most cases with a downgrade, and the valve 23. The concentrated washings discharged from the washing machine 1 through the conduit 2 flows through the housing of the control device 3, the float 6 of which rises owing to the high concentration and maintains the valves 5 and 23 open and the valves 4 and 20 closed by means of the lever 7 and the linkage 9, 10, 11, 14, 15, 16, 17. As a result, the highly concentrated washings flow through the valve 5 and the conduit 24 into the collecting vessel 25 for the concentrated contaminated washings. In this vessel the washings are agitated by the stirrer 27. The pump 30 sucks the washings from the collecting vessel 25 through the conduit 28 and discharges it through the conduit 35 into the centrifugal separator 33, where the washings are freed from impurities, which may be withdrawn through the conduit 34. The cleaned concentrated washings are then fed through the conduit 35 to the safety filtering unit 36, in the filtering device 37 of which any foreign matter which may still be contained in the washings is retained. The perfectly cleaned washings pass then through the conduit 38 into the supply vessel 39 for the alkaline solution or water used for dissolving the xanthate and have thus been made available for re-use.

When the concentration of the washings flowing from the washing machine 1 through the control device 3 decreases after the filter cloths have been pre-washed, the float 6 will drop and shift all valves so that the valves 5 and 23 are then closed and the valves 4 and 20 are opened. Fresh permutit water is then fed from the supply conduit 52 through the valve 20 into the washing machine 1 for the re-washing or final washing of the filter cloths. The dilute washings discharged from the washing machine 1 flows through the valve 4 and the conduit 46 into the collecting vessel 47 for dilute washings, from which they are sucked by the pressure pump 50 through the pipe 48 and discharged through the discharge conduit 51 into the viscose making apparatus 42, where they are used for cleaning the apparatus. When the washings have thus been enriched with viscose they are again used as a washing liquor for the pre-washing of filter cloths.

In view of the coupling of valves 4 and 5, valves 4 and 20 and valves 5 and 23, the supply of permutit water or effluent from the xanthate dissolver 42 through the conduit 44 to the washing machine 1 and the discharge of the washings into the collecting vessels 25 and 47 may be controlled so that the washing process desired according to the invention and the separation of the concentrated washings of the first washing stage from the dilute washings of the second stage will be positively obtained.

The process according to the invention enables the total amount of the viscose which has previously been lost on the way from the viscose making machines to the viscose processing machines, totalling about 1.5% to 2% of the actually produced amount, to be recovered in perfect condition and in a simple manner for re-use. Where at least two washing machines are employed the recovery may be carried out in a continuous operation. The process does not involve any disturbance of the normal manufacturing operations.

It is apparent that the process according to the invention has great economic importance. It does not only provide for the recovery of valuable raw materials required in the making of viscose, such as cellulose, caustic soda, carbon disulfide, possibly also of special expensive chemicals, in amounts which are significant particularly in large-scale operation but also enables further desirable simplifications and savings in the production of viscose.

The use of the washing water required for the making of viscose as a solvent for the cellulose xanthate involves substantial savings of softened water, because the permutit water required for re-washing the filter cloths has previously been discarded. The process according to the invention involves also a considerable reduction of the load on the settling and clarifying plants because they are no longer fed with viscose waste. The foreign matter separated in compact form in the centrifugal separators may be discarded by other methods, e.g., jointly with the waste from the spinning plant. This enables the use of much smaller clarifying plants, a simpler supervision thereof and the clearing of such plants in larger intervals. Another important advantage resides in the fact that the obnoxious smell previously emanated by the clarifying plants is now eliminated.

What is claimed is:

1. A process of recovering viscose from filter cloths and viscose making equipment, which comprises pre-washing the filter cloths with a liquor which contains free sodium hydroxide and fresh, non-aged viscose, to remove a major portion of the aged viscose contained in the filter cloths and obtain concentrated washings, re-washing the pre-washed filter cloths with permutit water having a pH-value not less than 7 to remove substantially all viscose from said cloths and obtain dilute washings, removing foreign matter from said concentrated washings by centrifugal separation and then using said concentrated washings for dissolving cellulose xanthate, and using said dilute washings for cleaning said viscose making equipment.

2. A process of recovering viscose from filter cloths and viscose making equipment, which comprises re-washing pre-washed filter cloths with permutit water having a pH-value not less than 7 to remove substantially all viscose from said cloths and obtain dilute washings, using said dilute washings for removing viscose from said viscose making equipment, then using said dilute washings containing said viscose removed from said equipment for pre-washing filter cloths containing aged viscose to remove a major portion of said aged viscose from said cloths and obtain concentrated washings, subjecting the pre-washed filter cloths to re-washing with said permutit water, removing foreign matter from said concentrated washings by centrifugal separation and then using said concentrated washings for dissolving cellulose xanthate.

3. A plant for recovering viscose from filter cloths and viscose making equipment, which comprises a drain adapted to be connected to said viscose making equipment, a centrifugal separator, a pressure pump, having an inlet and an outlet, a discharge line connected to the outlet of said pump for feeding the discharge of said pump to said viscose making equipment, a filter cloth washing machine, a first supply conduit connecting said drain to said washing machine, a second supply conduit connected to said washing machine for supply permutit water thereto, a discharge conduit connected to said washing machine for discharging effluent therefrom, a first branch connecting said discharge conduit to said centrifuge, a second branch connecting said discharge conduit to said inlet of said pressure pump, each of said supply conduits and branches incorporating a shut-off valve, said discharge conduit incorporating a control device operatively connected to said valves and responsive to the concentration of said effluent in said discharge conduit to keep said valves in said first supply conduit and said first branch open and to keep said valves in said second supply conduit and said second branch closed when said concentration is above a predetermined value and to keep said valves in said first supply conduit and said first branch closed and to keep said valves in said second supply conduit and said second branch open when said concentration is below said predetermined value.

4. A plant as set forth in claim 3, in which said control device is responsive to the specific gravity of said effluent.

5. A plant as set forth in claim 3, in which a collecting vessel and a pump are interposed in succession between said first branch and said centrifuge.

6. A plant as set forth in claim 3, in which a collecting vessel is interposed between said second branch and said pressure pump.

7. A washing installation for removing viscose from filter cloths which comprises a washing machine, first and second supply conduits for supplying different washing liquors to said washing machine, a discharge conduit connected to said washing machine for discharging effluent therefrom, first and second branches connected to said discharge conduits, each of said supply conduits and branches incorporating a shut-off valve, said discharge conduit incorporating a control device operatively connected to said valves and responsive to the concentration of said effluent in said discharge conduit to keep said valves in said first supply conduit and said first branch open and to keep said valves in said second supply conduit and said second branch closed when said concentration is above a predetermined value and to keep said valves in said first supply conduit and said first branch closed and to keep said valves in said second supply conduit and said second branch open when said concentration is above said predetermined value.

References Cited in the file of this patent

UNITED STATES PATENTS 2,647,891    Warburton _____ Aug. 4, 1953